Aug. 31, 1948.   C. HUGHES   2,448,313
AUTOMOBILE TIRE
Filed June 21, 1945
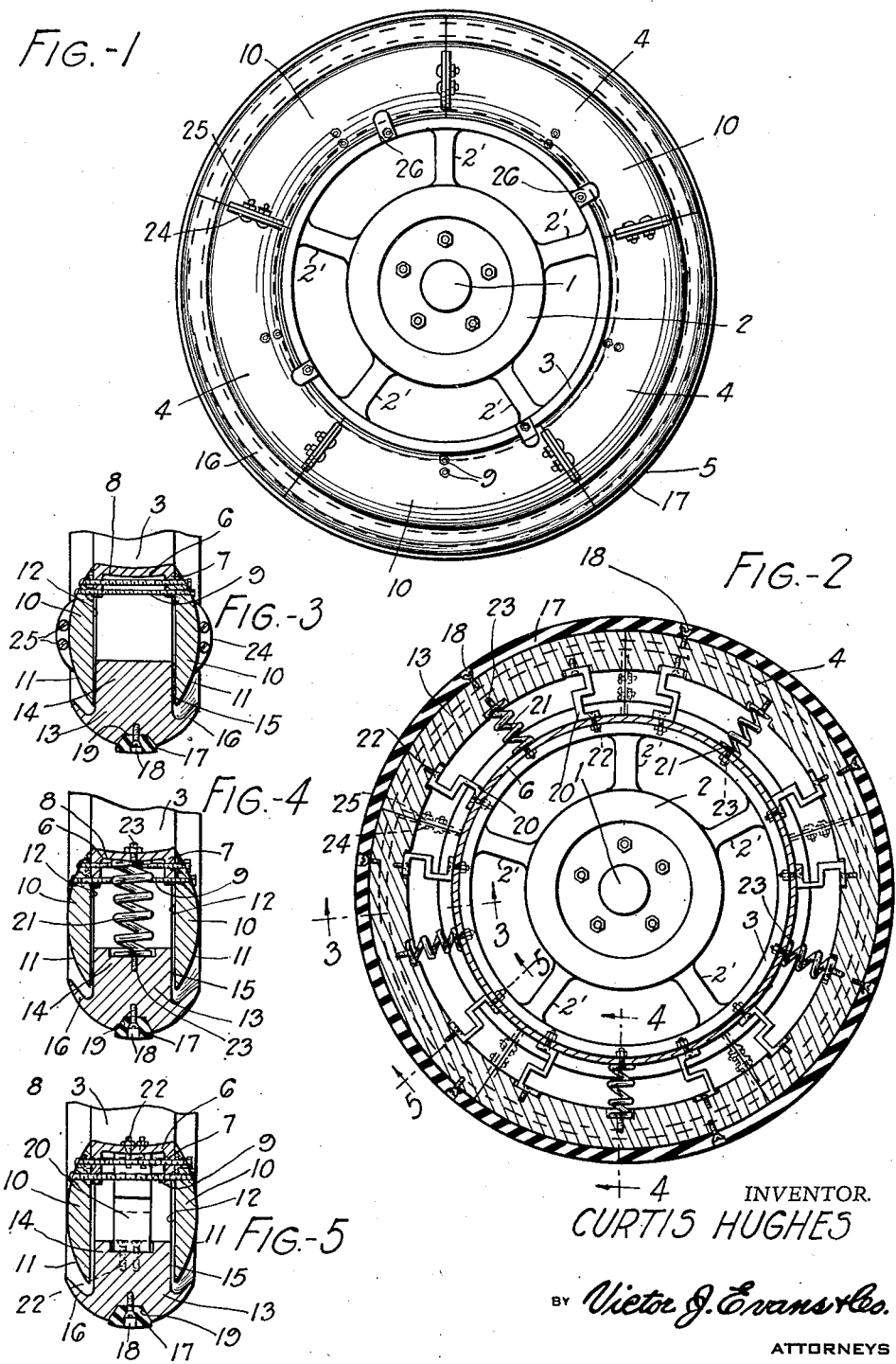
INVENTOR.
CURTIS HUGHES
BY Victor J. Evans & Co.
ATTORNEYS Patented Aug. 31, 1948

2,448,313

UNITED STATES PATENT OFFICE 2,448,313

AUTOMOBILE TIRE

Curtis Hughes, Forest, Tex.

Application June 21, 1945, Serial No. 600,704

1 Claim. (Cl. 152—39)

My present invention, in its broad aspect, has to do with improvements in resilient tires of the type designed for use on trucks, automobiles and the like, and especially to resilient tires of the type wherein springs are used to provide the necessary cushioning effect. More particularly, it is my purpose to provide a resilient tire which is formed with separable tire segments, each segment including leaf springs and a coil spring between inner and outer tire sections, and wherein the inner segment is U-shaped and has side plates forming a compartment for the springs, the outer section being movable with respect to the plates and inner section and carrying a suitable rubber tread element. In assembling my device, the plates of the segments are bolted together to hold all segments in assembly upon a wheel rim. The outer segment is symmetrically curved, and the plates have curved outer surfaces so that the appearance of the tire approaches that of a conventional tire. The outer section is mounted on the springs to provide resiliency and the arrangement of spring supporting structure is unique, sturdy and practical.

Other and equally important objects and advantages of my invention will be apparent from the following drawings, and description, but it is to be understood that changes in size, form, shape, materials, construction and arrangement of parts is permissible and within the purview of my broad inventive concept, and the scope of the appended claim.

In the drawings wherein I have illustrated a preferred form of my invention—

Figure 1 is a side elevation of a wheel equipped with a tire constructed in accordance with my invention;

Figure 2 is a vertical section;

Figure 3 is a transverse section on the line 3—3 of Figure 2;

Figure 4 is a transverse section on the line 4—4 of Figure 2, and

Figure 5 is a transverse section on the line 5—5 of Figure 2.

In the drawings wherein like characters of reference are used to designate like or similar parts throughout the several views:

The numeral 1 designates the axle of a vehicle on which is mounted a wheel 2 having spokes 2' and a rim 3.

Mounted in contiguous relationship on the rim 3 are a plurality of similar segments 4 making up a resilient tire 5. Since the segments are identical in form, the description of one will suffice for all.

Each segment 4 is formed with a U-shaped inner section 6 the flanges 7 of which extend outwardly, the bottom 8 is slightly concave. Bolted as at 9 to the flanges 7 are side plates 10 which have curved outer walls 11 and flat inner walls 12. The outer segment 13 has a curved tread, and a body part 14 having flat sides 15 which fit between the walls 12 of the plates. Side flanges 16 containing the curvature of the tread overlap the outer edges of the plates, or provide a shielding hood therefor as shown in Figures 3, 4 and 5. A resilient tread strip 17 is bolted as at 18 into a groove 19 in the tread of the outer section 13. The outer section 13 is resiliently supported on the inner section by three springs. Springs 20 are S-shaped, and spring 21 is a coil spring. Bolts 22 extend through the end parts of the S-shaped leaf springs 20 into the base of the inner section and through the outer tread section, and bolts 23 mount the coil springs between the leaf springs in the same manner, thereby holding the inner and outer sections in assembly on the rim. Each plate 10 has lateral end arcuate ears 24, and bolts 25 extend through the ears of adjacent plates to hold the segments together in a circular tire assembly about the rim. Spaced tire lugs 26 are carried by the rim 3 and clamp the inner sections in place on the rim, as shown in Figure 1.

From the foregoing, it is believed that the operation and advantages of my invention will be apparent, but it is again emphasized that interpretation of its scope should only be conclusive when made in the light of the subjoined claim.

I claim:

A resilient tire, comprising a plurality of similarly formed segments placed end to end to form a circular tire structure, each segment having an inner U-shaped section seated on a wheel rim, the base of said section being slightly concave, and the flanges thereof extended outwardly of said base, and an outer section having a body part and a curved tread portion, springs supporting the outer section on the inner section, two of said springs being substantially S-shaped leaf springs, and the other spring being a coil spring and located between the leaf springs, each of said springs attached to the inner section and the outer section, side plates having arcuate shaped outer faces attached to the flanges of the inner section and engaging the body part of the outer section and forming an enclosure for the space between the sections, arcuate flanges on said outer sections overhanging the outer edges of said plates, an annular seat in the tread portion of said outer section, a resilient tread member secured to said portion in said heat, the outer section having a body with flat parallel side walls which are adapted to slidably engage the flat inner walls of said plates, ears on said side plates and bolts extending through said ears for attaching the side plates of the sections together to form a tire assembly, and means for attaching the inner sections to the rim.

CURTIS HUGHES.

REFERENCES CITED

The following references are of record in the file of this patent:

UNITED STATES PATENTS

| Number | Name | Date |
|---|---|---|
| 1,005,406 | Brotherton | Oct. 10, 1911 |
| 1,249,678 | Shumway | Dec. 11, 1917 |
| 1,393,651 | Turnbull | Oct. 11, 1921 |
| 1,443,478 | Kovach | Jan. 30, 1923 |
| 1,450,740 | Helmick | Apr. 3, 1923 |